(12) United States Patent
Ligander et al.

(10) Patent No.: US 10,411,340 B2
(45) Date of Patent: Sep. 10, 2019

(54) ANTENNA MOUNT

(71) Applicant: TELEFONAKTIEBOLAGET LM ERICSSON (PUBL), Stockholm (SE)

(72) Inventors: Per Ligander, Göteborg (SE); Lars Bolander, Mölndal (SE); Håkan Wennström, Sävedalen (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 513 days.

(21) Appl. No.: 15/028,543

(22) PCT Filed: Apr. 4, 2016

(86) PCT No.: PCT/EP2016/057381
§ 371 (c)(1),
(2) Date: Apr. 11, 2016

(87) PCT Pub. No.: WO2017/174113
PCT Pub. Date: Oct. 12, 2017

(65) Prior Publication Data
US 2018/0083356 A1 Mar. 22, 2018

(51) Int. Cl.
*F16M 11/14* (2006.01)
*H01Q 3/08* (2006.01)
*H01Q 1/12* (2006.01)
*F16M 11/04* (2006.01)
*F16M 11/12* (2006.01)
*F16M 13/02* (2006.01)
*F16M 11/18* (2006.01)

(52) U.S. Cl.
CPC ............. *H01Q 3/08* (2013.01); *F16M 11/041* (2013.01); *F16M 11/046* (2013.01); *F16M 11/126* (2013.01); *F16M 13/02* (2013.01); *H01Q 1/125* (2013.01); *H01Q 1/1257* (2013.01); *F16M 11/18* (2013.01); *F16M 2200/024* (2013.01)

(58) Field of Classification Search
CPC ........ H01Q 3/08; H01Q 1/125; F16M 11/041; F16M 11/046; F16M 11/18; F16M 11/126; F16M 13/02; F16M 2200/024
USPC ............... 248/183.1, 183.2, 299.1, 419, 542; 343/766, 882
See application file for complete search history.

(56) References Cited

U.S. PATENT DOCUMENTS

| 5,999,139 A | 12/1999 | Benjamin et al. |
| 2002/0105478 A1 | 8/2002 | Overton |
| 2015/0034785 A1 | 2/2015 | Xiao et al. |

FOREIGN PATENT DOCUMENTS

| GB | 2 505 066 A | 2/2014 |
| WO | 2012149753 A1 | 11/2012 |

*Primary Examiner* — Gwendolyn W Baxter

(57) ABSTRACT

A mounting arrangement and an antenna mounting device for mounting a directional antenna to fixed infrastructure. The antenna mounting device comprises a first adjustment element comprising a first end, an infrastructure part for attaching the antenna mounting device to the fixed infrastructure, and an antenna attachment part for attaching the directional antenna to the antenna mounting device. Moreover, the first adjustment element is coupled to the infrastructure part and to the antenna attachment part, and configured to adjust a first orientation of the antenna attachment part relative to an orientation of the infrastructure part, to provide adjustment in a first direction of the directional antenna. Furthermore, the first end of the first adjustment element is configured to remain at a fixed position relative to the infrastructure part, independently of the relative orientation of the infrastructure and the antenna attachment part.

18 Claims, 11 Drawing Sheets

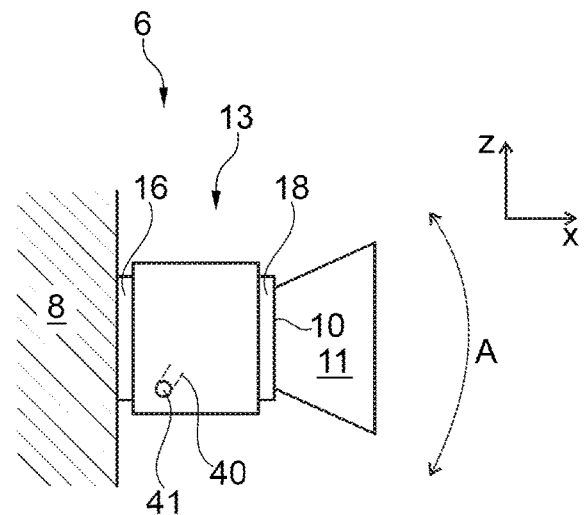
Fig. 3
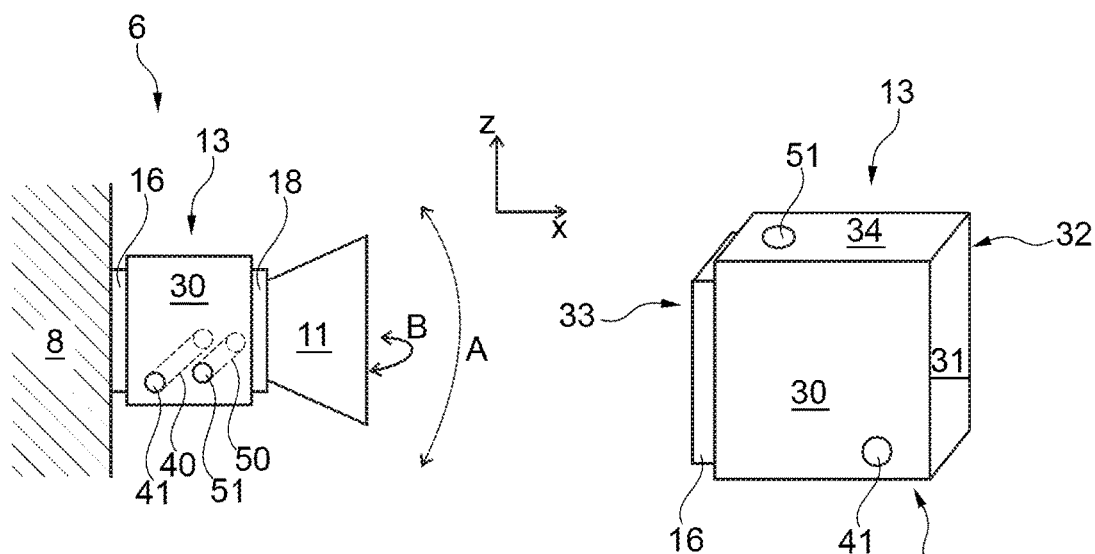
Fig. 4
Fig. 5

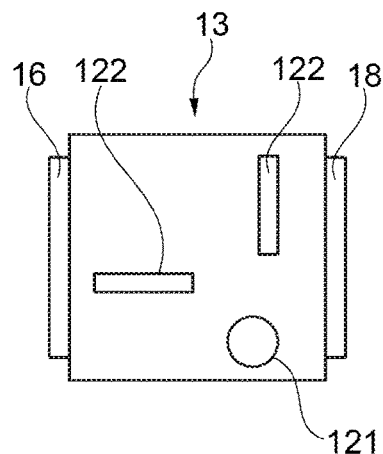
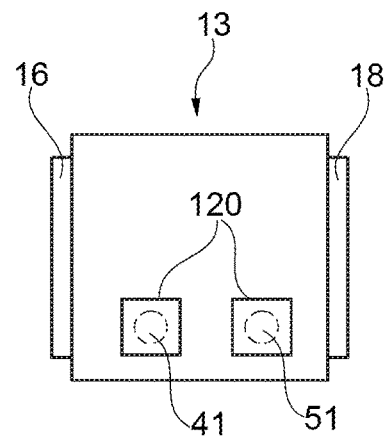
Fig. 16          Fig. 17
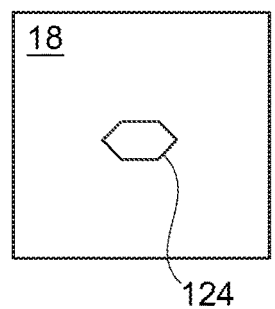
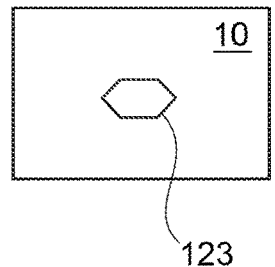
Fig. 18
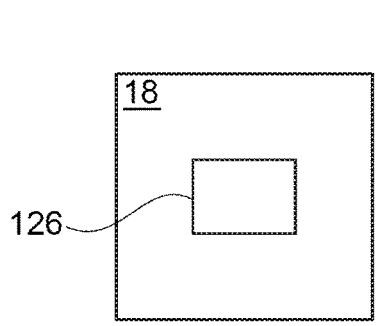
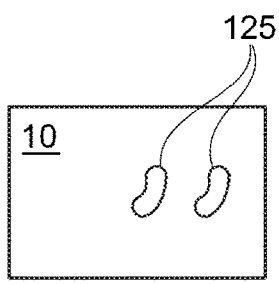
Fig. 19

ANTENNA MOUNT

TECHNICAL FIELD

The present disclosure relates to the field of communication technology. More particularly, the invention pertains to a mounting device and an arrangement for the attachment and alignment of a communication device.

BACKGROUND

Microwave communication is widely used in point-to-point communications e.g. between satellites and base stations, and in cellular systems. Moreover it is utilized in telecommunications to link a small scale communication infrastructure in e.g. remote areas to the main infrastructure without the need for physical lines.

Often, microwave communication is over line of sight propagation and utilizes directional antennas with a narrow main lobe and small side lobes.

The directional antennas are attached to an infrastructure, for example masts, walls or light-posts. The associated mounting arrangement has the purpose of securing the antenna and radio to the infrastructure as well as supporting the adjustment of the directional antenna aperture. The mounting and alignment of directional microwave antennas are based on manual tasks which cannot be accomplished from a ground position. Instead, the installer or field technician climbs the mast at the site with antenna mount equipment including mast bracket, antenna, radio and a number of tools. The installer's juggling with a number of tools and his constant need of changing positions when hanging high over ground makes the process a safety risk as well as a time consuming operation.

In view of the above, it is desirable to have a mounting device where the adjustment of the directional antenna is simplified.

SUMMARY

In the present disclosure an antenna mounting device and an arrangement is presented that simplifies the adjustment of a directional antenna.

According to aspects an antenna mounting device for mounting a directional antenna to fixed infrastructure adjustable in a first direction is disclosed. The antenna mounting device comprising a first adjustment element comprising a first end, an infrastructure part for attaching the antenna mounting device to the fixed infrastructure, and an antenna attachment part for attaching the directional antenna to the antenna mounting device. Moreover, the first adjustment element is coupled to the infrastructure part and to the antenna attachment part. The first adjustment element is also configured to adjust a first orientation of the antenna attachment part relative to an orientation of the infrastructure part, to provide adjustment in the first direction of the directional antenna. The first end of the first adjustment element is configured to remain at a fixed position relative to the infrastructure part, independently of the relative orientation of the infrastructure and the antenna attachment part.

An advantage is that the installation, that is the adjustments of the antenna aperture in one direction in order to achieve a preferred alignment of the directional antenna, can be made in a secure manner and that the installation is simplified. Moreover, the alignment of the antenna can be performed with a higher accuracy. Furthermore, the time for the alignment is reduced and it supports automatic alignment.

According to other aspects, the antenna mounting device, further comprise a second adjustment element comprising a first end. The second adjustment element is coupled to the infrastructure part and to the antenna attachment part. Moreover, the second adjustment element is configured to adjust a second orientation of the antenna attachment part relative to the orientation of the infrastructure part, to provide adjustment in the second direction of the directional antenna. Furthermore, the first end of the second adjustment element is configured to remain at a fixed position relative to the infrastructure part and relative to the first end of the first adjustment element, independently of the relative orientation of the infrastructure and the antenna attachment part.

Having two adjustment elements, each one relating to an adjustment of the antenna in a specific direction, enables the antenna to be directed in more directions.

Moreover, the first end of the first adjustment element and the first end of the second adjustment element can be positioned at a constant mutual distance during adjustment of the antenna attachment part.

In the case when two adjustment elements are present, and they are kept at a constant mutual distance during the adjustment, the adjustment procedure is simplified and the installation can be made in a secure manner. Furthermore, the time for the alignment is reduced and it supports automatic alignment. The keeping of adjustment elements at a constant mutual distance during the adjustment also allows for specific tools to be applied to the adjustment elements which tools may automate or otherwise simplify the adjustment procedure.

According to the previous aspects where the antenna mounting device comprises a second adjustment element comprising a first end, the first adjustment element can further comprise a second end and the second adjustment element can further comprise a second end. Furthermore, the second end of the first adjustment element and the second end of the second adjustment element can be positioned at a fixed position relative to each other independently of the relative orientation of the infrastructure and the antenna attachment part.

Such arrangement allows for an easier access, by, e.g., a field technician, to the adjustment elements.

Moreover, the infrastructure part may comprise a first side, wherein the first end of the first adjustment element and the first end of the second adjustment element are arranged in connection to the first side.

The alignment of the adjustment screws for the first direction and the second direction close to each other and on the same side of the antenna mount provides for a less time consuming antenna alignment and it is also easier to achieve a proper antenna alignment. Furthermore, the arrangement supports automatic alignment of the antenna with specific equipment used by the installer or field technician.

Alternatively, the infrastructure part may comprise a first side and a second side. The first end of the first adjustment element is arranged in connection to the first side and the first end of the second adjustment element is arranged in connection to the second side.

Due to e.g. the mechanical construction of the antenna mounting device or a placement of automatic steering equipment it might be beneficial to have the ends of the adjustment elements on different sides of the antenna mounting device.

Other aspects are related to at least one of the first adjustment element and the second adjustment element. That is, at least one of the first adjustment element and the second adjustment element may comprise a gear screw being in engagement with a gear wheel such that a rotation of the gear screw pivots the gear wheel about a gear wheel axis. Furthermore, the pivoting about the gear wheel axis pivots the antenna attachment part about at least one of a first pivot axis and a second pivot axis to provide adjustment in one of the first direction and the second direction of the directional antenna.

Thereby the accuracy of the adjustment increases. Moreover, a torque applied to the ends of the adjustment elements can be scaled in magnitude by the gear wheel. Furthermore, the introduction of gears opens up for an increased freedom to position the adjustment elements in various ways in relation to the antenna attachment part.

According to the previous aspects where the adjustment elements may comprise gear screws and gear wheels, at least one of the first gear wheel and the second gear wheel can be operatively connected to a universal joint and the universal joint is further operatively connected to the antenna attachment part.

The universal joint reduces the need for the gear wheel axis and the associated pivot axis of the antenna attachment part to be aligned in order to provide adjustment in one direction of the directional antenna attached to the antenna attachment part.

Moreover, the previous mentioned gear screw and the gear wheel may form a self-locking worm gear.

By utilizing this kind of device there is no need for lock nuts. Moreover, the accuracy of the adjustment is increased.

Alternatively, the previously mentioned gear screw and gear wheel may form a bevel gear.

By utilizing this kind of device there is a freedom to position the adjustment elements in various ways in relation to the antenna attachment part.

Yet other aspects that are related to at least one of the first adjustment element and the second adjustment element is that at least one of the first adjustment element and the second adjustment element may comprise a screw with a center axis. The screw is further in engagement with a locking arrangement, and a universal joint, and coupled to the antenna attachment part such that a pivoting of the screw about its centre axis pivots the antenna attachment part about one of a first pivot axis and a second pivot axis.

Thereby it is provided for a simple mechanical solution to transfer the input torque applied to the end of an adjustment element to the alteration of the antenna attachment part, and thereby the directional antenna, in one direction, e.g. an alteration of the antenna in the elevation direction.

Further aspects, related to at least one of the first adjustment element and the second adjustment element are that at least one of the first adjustment element and the second adjustment element may comprise a screw with a centre axis. The screw is further in engagement with a nut such that a pivoting of the screw about its centre axis moves the nut axially along the centre axis of the screw. The nut can further be coupled via at least one flexible joint to an attachment point on a movable member. The movable member can be operatively coupled to the antenna attachment part such that a movement of the attachment point pivots the antenna attachment part about one of a first pivot axis and a second pivot axis.

Thereby it is provided for a simple mechanical solution to transfer the input torque applied to the end of an adjustment element to the alteration of the antenna attachment part, and thereby the directional antenna, in one direction, e.g. an alteration of the antenna in the azimuth direction.

According to further aspects regarding the adjustment elements, the first adjustment element and the second adjustment element can be the same type of structural members.

Having similar adjustment elements further simplifies the antenna adjustment procedure.

The first direction may correspond to an altitude direction of the directional antenna when mounted to the fixed infrastructure. This enables the directional antenna to be altered in an elevation direction.

Moreover, the second direction may correspond to an azimuth direction of the directional antenna when mounted to the fixed infrastructure. This allows for the directional antenna to be altered in an azimuth direction.

A compass and/or at least one level control equipment can be attached to the antenna mounting device. These devices further aid the installer in the alignment process of the antenna.

The directional antenna can be attached to the antenna attachment part in several ways. That is, according to some aspects the directional antenna comprises a click on device and the antenna attachment part comprises a matching click on device.

According to other attachment aspects, the directional antenna comprises at least one of a snap link and a snap link attachment device and wherein the antenna attachment part comprises at least one snap link attachment device and a snap link.

The described attachment solutions provide for alternative simple and less time consuming attachments of the antenna to the antenna attachment part and thereby the antenna mounting device.

Other aspects are related to a mounting arrangement. That is, a mounting arrangement comprising an infrastructure and at least one antenna mounting device where the antenna mounting device is connected to the infrastructure and at least one directional antenna with at least one radio.

Thus there is provided herein a mounting arrangement facilitating the alignment of a directional antenna in order to provide for communication with another antenna. Thereby, the same advantages and benefits are obtained for the mounting arrangement as for the antenna mounting device as such.

REFERENCE LIST

A, B First direction, Second direction
5 Wireless communication system
6 Mounting arrangement
8, 9 Infrastructure
10 Antenna attachment side
11 Directional antenna
12 Radio
13 Antenna mounting device
14 Attachment device
15 Clamp
16 Infrastructure part
18 Antenna attachment part
19 Movable member
25 Communication
30, 31, 32, 33, 34, 35 Sides
38, 39 First pivot axis, Second pivot axis
40, 90 First adjustment element
41, 91, 101 First end of first adjustment element
42, 92 Second end of first adjustment element
43 Centre axis of first adjustment element 44, 46, 47 Lever
45 First gear wheel axis
48 First gear wheel
49, 49a, 49b, 71 Joint
50, 60 Second adjustment element
51, 61 First end of second adjustment element
52, 62 Second end of second adjustment element
53 Centre axis of second adjustment element
55 Second gear wheel axis
58 Second gear wheel
70, 81 Nut
73 Attachment point
76 Angle of rotation
82, 84 Tilting arrangement
83 Pivot axis of the tilting arrangement
85, 86, 87 Angled lever
93 Locking arrangement
95 Gear screw
96 Gear wheel
97 Worm face gear
98 Worm gear, Worm drive
99 Spiral bevel
120 Automatic adjustment equipment
121 Compass
122 Level control equipment
123, 124 Click on device, Matching click on device
125, 126 Snap link, Snap link attachment device

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 3 is a schematic drawing of aspects relating to an antenna mounting arrangement of the present disclosure in an xz-plane.

FIG. 4 is a schematic drawing of further aspects relating to a mounting arrangement of the present disclosure in the xz-plane.

FIG. 5 illustrates several aspects of the present disclosure; among others, the different sides of an antenna mounting device are shown.

FIG. 16 shows additional devices that can be added to all exemplary variants of the antenna mounting device.

FIG. 17 shows automatic adjustment equipment 120 that can be added to all exemplary variants of the antenna mounting device.

FIG. 18 shows additional attachment devices that can be added to all exemplary variants of the antenna mounting device.

FIG. 19 shows further additional attachment devices that can be added to all exemplary variants of the antenna mounting device.

DETAILED DESCRIPTION

Figure 1:
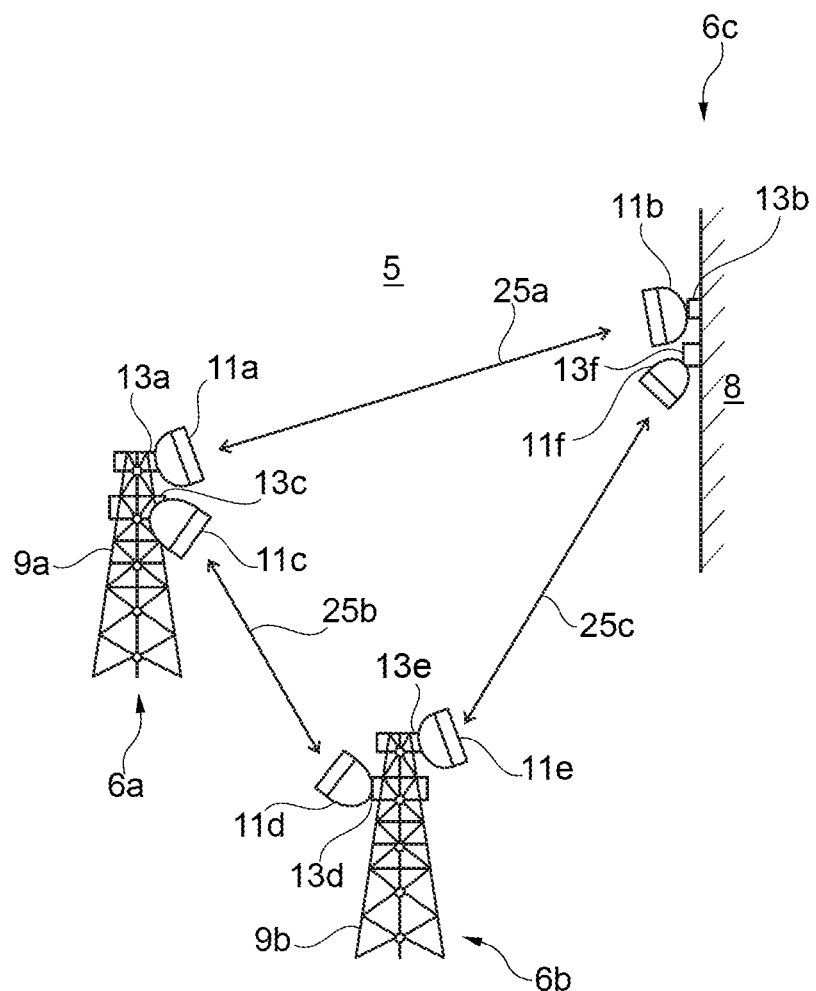
FIG. 1 shows a wireless communication system comprising mounting arrangements.

Aspects of the present disclosure will be described more fully hereinafter with reference to the accompanying drawings. The devices disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and it is not intended to limit the invention. As used herein, the singular forms "a", "an" and "the" are intended to include the plural forms as well, unless the context clearly indicates otherwise.

The expression adjustment of a directional antenna, as used later in the present disclosure, refers to an adjustment of an antenna in a first and a second direction. That is, a first direction along a first directional vector and a second direction along a second directional vector. The first direction and the second direction can be any directions. It is implicitly understood that the antenna itself is not necessarily adjustable. That is, it is the antenna mounting device that adjusts the antenna, and in particular adjusts the pointing direction of the directional antenna main lobe.

According to some aspects, the first direction corresponds throughout the text to an altitude or elevation direction of the directional antenna when mounted to the fixed infrastructure, whereas, the second direction corresponds to an azimuth direction of the directional antenna when mounted to the fixed infrastructure.

According to some aspects, a Cartesian coordinate system is introduced where the xy-plane is the horizontal plane and a movement in this plane is referred to as an adjustment in the azimuth direction. A movement in a vertical plane, i.e., the xz-plane or the yz-plane, is then referred to as an adjustment in the elevation or altitude direction. These choices of adjustment directions are introduced in order to ease the understanding and should under no circumstances be seen as limitations of the scope of protection.

As is implicitly understood, it is the antenna opening or the antenna aperture, i.e., the surface from where the transmission and reception of electromagnetic waves takes place that is to be adjusted in order to optimize the antenna's communication capability. For example, when talking about the adjustment in the elevation direction of the antenna, it is the adjustment of the antenna aperture in the elevation direction that is referred to. Moreover, the antenna mounting device comprises an antenna attachment part on to which the antenna is attached. To simplify, the adjustment direction of the antenna aperture is interpreted as the movement direction of the antenna attachment part. Hence, if the antenna is adjusted in the elevation direction, the movement of the antenna attachment part giving rise to that adjustment is said to be in the elevation direction. Hence, reference to the adjustment of the antenna or the antenna attachment part is interchangeable throughout the text. This is by no way a limitation of the scope of protection; it is just a definition of how the movement of the antenna attachment part is named in relation to the movement of the antenna aperture.

It is understood that there is a specific level of tolerance to be applied in the discussion of "fixed or constant positions" and "fixed or constant distances" within the present technical field. That is, vibrations and other small spatial movements arising when force is applied to ends of adjustment elements are movements within the tolerance levels. Hence, in this context the pressure applied to a button is not considered as changing the buttons position. Furthermore, "fixed" and "constant" in this context refers to spatially fixed/constant, not rotationally fixed/constant. Hence, in the case when the adjustment elements are screws or elements with similar properties, the ends and the entire screw are rotated when a torque is applied at an end. That is, a point not located on the centre axis of the screw is naturally going to change its position when rotated. To be clear, when looking at the ends of the disclosed adjustment element as such, they do not as such alter their positions. That is, the first ends pivots about the centre axes of each adjustment elements, which means that a non-centre point on the first end moves in space but the centre point is fixed in space.

Some of the example embodiments presented herein are directed towards an antenna mounting device for mounting a directional antenna to fixed infrastructure. As part of the development of the example embodiments presented herein, a problem will first be identified and discussed.

The disclosed device proposes a simplified way of adjusting a directional antenna attached to infrastructure. This is achieved by reducing the number of elements, i.e., screws, nuts, lock nuts, and washers, that the field technician needs access in order to adjust the antenna. Moreover, the adjustment elements are positioned such that they are easy accessible and such that they do not move during the adjustment of the directional antenna.

To facilitate the understanding of the proposed mounting solution different aspects relating to the adjustment of directional antennas is further elaborated.

A wireless communication system 5 with mounting arrangements 6a-6c is shown in FIG. 1. The mounting arrangements 6a-6c comprise infrastructure, such as e.g. masts 9a-9b, walls 8, buildings or light-posts. They further comprise antenna mounting devices 13a-13f and directional antennas 11a-11f. The directional antennas 11a-11f are attached to infrastructure by the antenna mounting devices 13a-13f. The directional antennas illustrated in FIG. 1 are positioned such that two antennas on different masts are able to communicate via line of sight 25a-25c. However, directional antennas may also be employed in non-line-of-sight (NLOS) communication. The antenna mounting devices disclosed herein are applicable also in NLOS communication scenarios.

For simplicity, the antennas in the application refer to directional microwave antennas. However, the antenna mounting device can be utilized in aligning any antenna communicating at frequencies other than those in the microwave range. That is, the terms antenna, directional antenna, and directional microwave antenna, will be used interchangeably throughout the text.

The safety risk for the installers is not negligible since they have to perform installations high above ground wearing safety ropes. Today, the adjustment of the directional antenna is associated with tightening of several adjustment elements, locking devices etc. which means that the installer needs to carry a variety of tools with him. That is, the installer climbs the mast at the site with antenna mount equipment including mast bracket, antenna mounting device, antenna, radio and a number of tools. The antenna is commonly attached to the antenna mounting device by screws. The antenna mounting device is assembled on the mast by e.g. a bracket and a rough alignment is done, before the bracket is fixed. This alignment is often performed manually by hand, forcing the installer to change his position several times, and may also require significant physical strength from the installer or field technician. The radio is assembled on the antenna and the installer starts up the radios and measures the power in the received radio signal, i.e., the Received Signal Strength Indicator, RSSI. Now the fine tuning of the alignment starts, and in order to receive the best RSSI the installer needs to move around and use different hand tools in order to reach and alter several adjustment elements, such as screws, washers, lock nuts, comprised in the mounting device. The adjustment screws are located in different positions on the antenna mount. Furthermore, the position of the heads of the adjustment screws and the lock nuts moves in relation to each other and in relation to the fixed infrastructure during the adjustment procedure. That is, the contact surfaces where the installer needs to apply his tools moves around during the installation process. When the best RSSI is found the installer tighten a number of locking screws on the antenna mount. Moreover, a two-hand grip is required to lock a system comprising two lock nuts in engagement with an adjustment screw. Specifically, it is hard to get a high accuracy when the adjustment requires simultaneous tightening. That is, in addition of being potentially dangerous, due to the climbing, the adjustment is also time-consuming and less accurate.

The proposed antenna mounting device provides for a simpler mounting and aligning of directional antennas. Some aspects of a mounting arrangement is shown in FIG. 3 where an antenna mounting device 13 for mounting a directional antenna 11 to fixed infrastructure 8 adjustable in a first direction A is illustrated. The antenna mounting device 13 comprising a first adjustment element 40 comprising a first end 41, an infrastructure part 16 for attaching the antenna mounting device 13 to the fixed infrastructure 8, and an antenna attachment part 18 for attaching the directional antenna 11 to the antenna mounting device 13. Moreover, the first adjustment element 40 is coupled to the infrastructure part 16 and to the antenna attachment part 18. The first adjustment element 40 is also configured to adjust a first orientation of the antenna attachment part 18 relative to an orientation of the infrastructure part 16, to provide adjustment in the first direction A of the directional antenna 11. The first end 41 of the first adjustment element 40 is configured to remain at a fixed position relative to the infrastructure part 16, independently of the relative orientation of the infrastructure 8 and the antenna attachment part 18.

That is, by applying a torque or other force to the first end 41 of the first adjustment element 40 the antenna 11 is adjusted in the first direction A, i.e., an elevation direction in the xz-plane in FIG. 3. Moreover, the first end 41 of the first adjustment element 40 does not change its position, i.e., its position is constant, while the antenna 11 changes its position.

The fixed infrastructure can as previously mentioned in reference to FIG. 1, be masts 9a-9b, walls 8, buildings or light-posts. The term fixed means in the context of infrastructure that the mutual positions between two infrastructures with associated mutually aligned antennas is the same over time. Thus, the fixed infrastructure in this context could be two masts on a boat.

The side of the antenna 11 that is attached to the antenna attachment part 18 is referred to as the antenna attachment side 10.

The antenna 11 can according to further aspects be enabled to be adjustable in a second direction B. This is illustrate in FIG. 4, where the antenna mounting device 13 in the mounting arrangement 6, further comprise a second adjustment element 50 comprising a first end 51. The second adjustment element 50 is coupled to the infrastructure part 16 and to the antenna attachment part 18. Moreover, the second adjustment element is configured to adjust a second orientation of the antenna attachment part 18 relative to the orientation of the infrastructure part 16, to provide adjustment in the second direction B of the directional antenna 11. In the example of FIG. 4, the second direction B corresponds to an azimuth direction. Furthermore, the first end 51 of the second adjustment element 50 is configured to remain at a fixed position relative to the infrastructure part 16 and relative to the first end 41 of the first adjustment element 40, independently of the relative orientation of the infrastructure 8 and the antenna attachment part 18.

If, for example, the first and the second directions are chosen to be orthogonal to each other, then the antenna can easily be adjusted to point in any direction. The limitation is of course, the physical restrictions of the antenna attachment part. That is, by applying a torque or other force to the first end 51 of the second adjustment element 50 the antenna 11 is adjusted in e.g. the azimuth direction B.

Moreover, the first end 51 of the second adjustment element 50 does not change its position, i.e., its position is constant in space, while the position of the antenna 11 is adjusted. This further implies that the position of the first end 51 of the second adjustment element 50 does not change in relation to the position of the first end 41 of the first adjustment element 40 or in relation to the infrastructure 8 when the adjustment of the antenna 11 takes place.

That is, the adjustment elements provided to adjust the directional antenna 11 are positioned such that they do not move in relation to each other during installation or alignment of the antenna. Hence, the installer or field technician does not need to move around once he has climbed to the position of installation. By utilizing self-locking adjustment elements the adjustment of the directional antenna can be made by a one-hand grip which increases the accuracy. Moreover, in the case where the adjustment elements 50 are located close to each other and maybe also aligned on the same side of the antenna mounting device 13 it is possible to use an automatic adjustment equipment.

Expressed differently the antenna mounting device 13, wherein the first end 41 of the first adjustment element 40 and the first end 51 of the second adjustment element 50 are positioned at a constant mutual distance during adjustment of the antenna attachment part 18.

In other words, the first end 41 of the first adjustment element 40 and the first end 51 of the second adjustment element 50 are positioned in a fixed spatial relation to each other such that the spatial relation does not change during alteration of the antenna attachment part 18.

An advantage of having the end of the first (and in the case when two adjustment elements are present, also the end of the second) adjustment element in a fixed position relative to the infrastructure part during adjustment of the antenna 11 is that the installation is simplified and it can be performed in a more secure manner. The installer can site or position him in a secure position where he, during the whole installation, has a clear view over the adjustment element (or elements if two) and a good working position. Moreover, since the installer does not need to, more or less simultaneously, tighten several nuts the alignment becomes more accurate and the time to completion is reduced. The previous simultaneous tightening of the several nuts required the installer to handle two tools synchronously, each in either hand, increasing the risk of losing balance. In the presented disclosure, only one tool is required in order to adjust the antenna in at least one direction, the tool being suitable to apply a force to the end of the adjustment element. Hence, the installer only needs to carry with him one tool suitable for each present adjustment element and not as previously, a whole set of tools.

Having the adjustment elements aligned at a fixed mutual distance facilitates the use of a double-drill solution. The double-drill solution can be a specific hand tool, preferably but not necessary a one-hand grip tool, having one engagement surface for each first ends of the adjustment elements. That is, the installer does not have to change the position of the one tool needed for adjustment during the adjustment of the two directions of the antenna. Moreover, by utilizing this tool the installer can choose if he wants to adjust one adjustment element at the time or both simultaneously. It might even be possible to pre-program the double-drill tool such that when positioned in engagement with the adjustment elements e.g. a rough pre-installation of the antenna is executed.

According to aspects, the first adjustment element 40 and the second adjustment element 50 comprise screws, gear screws, buttons or other devices configured such that an applied force is transmitted through further mechanical coupling and transformed into a movement of the antenna attachment part. In many examples, e.g. where the adjustment elements comprise screws, the first ends 41, 51 might also be referred to as heads. Hence, throughout the text the terms ends and head will be utilized interchangeable without any limitation to the scope of protection. That is, both terms refer to the surface of the adjustment elements where an external force is applied in order to change the position of the antenna. In other words, the end or head refers to the part of the adjustment element that is accessible for adjustment.

Figure 2:
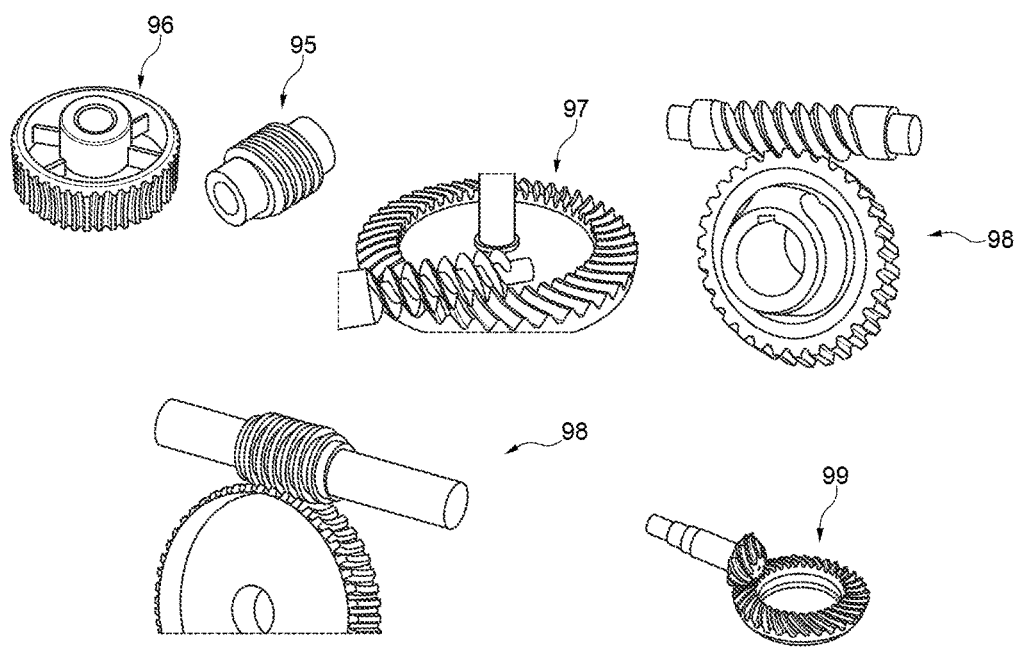
FIG. 2 illustrates different types of gears.

With reference to FIG. 2, the adjustment elements 40, 50 can be gear screws. There are several different types of gears, e.g. worm gears 98, worm face gears 97, bevel gears 99, cage gears and rack and pinion gears. The worm gear 98 is also referred to as slewing drive or worm drive, and the cage gear is also referred to as Lantern gear or Lantern pinion. The different gears can all be utilized in the mechanical solution of transferring an input force, applied to the adjustment element, into an adjustment of the directional antenna.

A gear or a cogwheel comprises a rotating part having cut teeth, or cogs, which mesh with another toothed part to transmit torque. The teeth on the two meshing gears all have the same shape. The larger of the two interacting gears is often referred to as gear wheel 96 and the smaller of the two interacting gears are referred to as worm, shaft, pinion or gear screw 95. The gears are inter alia defined by their number of teeth or in the case of worms, its number of thread starts. Moreover, the gear wheel has a pivot gear wheel axis and the pinion has a centre axis of pivoting. Gears almost always produce a change in torque.

The gear ratio is defined as an input quantity relative to an output quantity, where the quantity might be the torque, the angular speed, the number of teeth, or the radius. Moreover, the quantities are mutually related, e.g. the angular speed gear ratio can be translated into angular distance gear ratio which in reference to the presented subject matter relates to the accuracy of the adjustment. That is, an angular speed gear ratio of e.g. 20:1 means that an input rotation of 20 degrees results in an output rotation of 1 degree. Hence, the higher the input quantity is in relation to the output quantity the higher is the achieved accuracy.

A worm gear comprises two elements that are called the worm screw/worm/gear screw 95 and worm wheel/gear wheel 96. The gear screw 95 is designed with a number of threads or worms, i.e., starting engagement points that are in engagement with the gear wheel. In worm gears 98, the rotation of the gear screw 95 turns the gear wheel 96 about an axis perpendicular to the centre axis of the gear screw. In a worm gear the speed of the driven member is reduced and the torque is multiplied; increasing it proportionally as the speed decreases. The angular speed gear ratio depends upon the relation of the number of threads on the gear screw to the number of teeth in the gear wheel. With a single start worm, for each 360° turn of the gear screw, the gear wheel advances only one tooth of the gear. Moreover, worm gear configurations in which the gear cannot drive the gear screw are called self-locking.

Bevel gears 99 can be divided into subcategories, i.e., helical bevel gears and spiral bevel gears which have canted or curved cogs, straight bevel gears which have straight cogs and hypoid gears which are similar to a spiral bevel. Bevel gears are most often mounted on shafts that are 90 degrees apart, but they can be designed to work at other angles as well.

The rack and pinion gear is a gear which meshes with a linear toothed part, called a rack, thereby producing translation instead of rotation.

The material of the gear can be e.g. metal or some polymer. By utilizing polymers the weight and the cost is reduced. However, the wearing is greater using polymers than metal. Today, most adjusting elements in antenna mounting devices are of metals. The elements corrode which is favorable in the sense that the corrosion locks the elements such that the position of the antenna is fixed. The downside is that a new adjustment of the antenna is not possible. To be able to adjust the antenna during a long period of time adjusting elements made of metals with an acid- and corrosion-protected cover or alloy can be utilized.

The infrastructure part 16, c.f. FIG. 4, comprises at least one part that is in direct physical contact with the infrastructure 8 when attached to the infrastructure. The attachment can be made by clamps, screws, or by any other suitable elements. Independent of the elements utilized to attach the infrastructure part 16 to the infrastructure 8 the attachment fixates the infrastructure part 16 to the infrastructure 8. That is, once attached, the infrastructure part 16 does not move in relation to the infrastructure 8. Moreover, since the adjustment elements 40, 50 are positioned at fixed positions relative to the infrastructure part 16 even the area of the antenna mounting device where the adjustment elements 40, 50 penetrate the outer part of the antenna mounting device 13 is at a fixed position relative to the infrastructure part 16. Hence, the infrastructure part 16 might be considered to comprise the area of the antenna mounting device 13 where the adjustment elements 40, 50 go through the outer part of the antenna mounting device 13.

The antenna mounting device 13 can also comprise other parts, e.g. a housing or a cover, for e.g. protection of the inner mechanical structure from insight or external impacts such as weather conditions or preventing birds to nest. For definition purpose, all parts of the antenna mounting device 13 that are fixed relative to the infrastructure 8 when the antenna mounting device 13 is attached, can be interpreted as being comprised in the infrastructure part 16.

According to aspects, the ends 41, 51 of the adjustment elements 40, 50 in FIG. 4 can be positioned differently in relation to the infrastructure part 16 where the attachment elements penetrate the surface. The positioning depends on what is most appropriate for that specific embodiment. For example, if a specific tool is to be utilized it might be convenient that the surfaces of the ends 41, 51 where the tool is to be engaged is in the same plane as or in a countersunk position relative to the outer part of the surface of penetration. Alternatively, it might be preferable to position the ends 41, 51 in a raised position in relation to said surface of the infrastructure part 16. This could for example be the case when a double-drill solution or an automatic control device is coupled to the adjustment elements. Of course, in the case of more than one adjustment element the ends of the adjustment elements 40, 50 can each be positioned differently in relation to the outer surface of the infrastructure part 16.

Moreover, according to other aspects of the antenna mounting device illustrated in FIG. 4, the infrastructure part 16 comprises a first side 30 wherein the first end 41 of the first adjustment element 40 and the first end 51 of the second adjustment element 50 are arranged in connection to the first side 30.

In other words, the first ends 41, 51 of the first adjustment element 40 and the second adjustment element 50 are arranged on the same side of the parts of the antenna mounting device 13 that are fixed relative to the infrastructure 8. Both adjustment elements 40, 50 penetrating through said side 30.

In one example variant this means that both adjustment elements 40, 50 are arranged on the same side 30 such that a centre axis of the first adjustment element and a centre axis of the second adjustment element are parallel in relation to each other and perpendicular to the first side 30.

The alignment of the adjustment elements 40, 50 for the first direction A and the second direction B close to each other and on the same side 30 of the antenna mounting device 13 provides for a less time consuming antenna alignment and it is also easier to achieve a proper antenna alignment. This is due to the fact that the installer is able to position himself in a comfortable position where he during the whole installation process has a clear overview of and an easy access to both adjustment elements. Furthermore, the arrangement supports automatic alignment of the antenna with specific equipment used by the installer, e.g. the double-drill solution.

Further aspects regarding the adjustment elements 40, 50 is that the first adjustment element 40 and the second adjustment element 50 can have different appearances, that is, they could e.g. be of different sizes or of different types, for example one could be a screw and the other could be a gear screw which is further engaged to a gear wheel.

Moreover, the first end 41 of the first adjustment element 40 can have a different structure than the first end 51 of the second adjustment element 50. For example, the sizes of the heads can differ. In addition or alternatively, the attachment surface where the tool is applied can have different shapes, e.g. slot, square, cross, hex socket, double-square, Frearson, etc.

Such solutions can aid the installer in separating the first adjustment element 40 associated with the adjustment of the antenna 11 in the first direction A, e.g. the elevation direction, and the second adjustment element 50 associated with the adjustment of the antenna 11 in the second direction B, e.g. the azimuth direction.

An alternative of having different appearance of the first adjustment element 40 and the second adjustment element 50 is to have a solution where the first adjustment element 40 and the second adjustment element 50 are the same type of structural members.

To be clear, even if the ends 41, 51 of the different adjustment elements 40, 50 are of the same type of structural members this does not necessary imply that the rest of the adjustment elements are similar.

Having the ends 41, 51 of different adjustment elements 40, 50 with the same appearance is favourable since only one type of tool is needed for adjustment, that the antenna adjustment procedure is simplified. If for example an electrical screwdriver is applied in the adjustment then the installer does not have to change the small screw bit and thereby risking dropping it.

Moreover, in the case when automatic alignment is utilized, the same equipment for automatic adjustment can be employed to all ends 41, 51 of the adjustment elements 40, 50.

This is illustrated in FIG. 17 where further aspects of the antenna mounting device 13 are shown. Here, at least one of the first end 41 of the first adjustment element 40 and the first end 51 of the second adjustment element 50 are configured to be automatically adjusted by automatic adjustment equipment 120. The utilization of automatic adjustment equipment is compatible with all other variants of the antenna mounting device 13 described in the text where it is possible to automate the adjustment process.

Hence, since the adjustment element/s 40, 50 does/do not change its/their spatial position/s during the adjustment of the antenna, automatic alignment is supported. That is, a step motor or other equipment for automatic adjustment of the adjustment element/s can easily be installed. Specifically, if the equipment for automatic adjustment supports wireless steering, the alignment of the antenna can be done from a distance, e.g. the installer can be on the ground or in another remote location when altering the antenna position.

As an alternative to having the ends 41, 51 of the adjustment elements 40, 50 on the same side, another solution is presented in FIG. 5, showing other aspects of the antenna mounting device 13. In this illustration the infrastructure part 16 comprises a first side 30 and a second side 34.

The first end 41 of the first adjustment element 40 is arranged in connection to the first side 30 and the first end 51 of the second adjustment element 50 is arranged in connection to the second side 34.

That is, the surfaces of the ends 41, 51 where the tool is to be engaged are arranged on different sides 30, 34 of the part of the antenna mounting device 13 that are fixed relative to the infrastructure. Hence, the first adjustment element goes through the first side 30 and the second adjustment element goes through the second side 34.

Due to e.g. the mechanical construction of the antenna mounting device 13 or a placement of automatic steering equipment it might be beneficial to have the ends 41, 51 of the adjustment elements on different sides of the antenna mounting device 13.

All sides of the antenna mounting device 13 that are fixed relative to the infrastructure part 16 is figuratively shown in FIG. 5 and would, to ease the description, be referred to as left side 30, front side 31, right side 32, back side 33, second side 34, and underside 35.

To further aid in the installer to adjust the antenna to a position where good communication is received, a compass 121 and/or at least one level control equipment 122 can be attached to the antenna mounting device 13, see an illustration in FIG. 16 showing further aspects of the antenna mounting device 13.

The compass 121 helps the installer to align the antenna towards a given geographical position, i.e., the geographical position of the antenna with which the mounted antenna is to be communication with. The lever control equipment 122 aids the installer in positioning the antenna 11 vertically and horizontally in relation to the ground.

The directional antenna 11 can be attached to the antenna attachment part 18 in several ways, for example by screws or bolts. However, it is also a possibility that the directional antenna 11 comprises a click on device 123 and the antenna attachment part 18 comprises a matching click on device 124, see an illustration of these aspects in FIG. 18.

It is the antenna attachment side 10 that is attached to the antenna attachment part 18, see also FIG. 3. That is, the click on device 123 and the matching click on device 124 form a pair of mating connectors, one being the female part and the other the male part. The click on devices 123, 124 can e.g. have the shapes of female and male plugs or the shape of a clip with a corresponding attachment hole.

Another alternative is to let the directional antenna 11 comprise at least one of a snap link 125 and a snap link attachment device 126 and wherein the antenna attachment part 18 comprises a snap link attachment device 126 and a snap link 125, see an illustration in FIG. 19, where two snap links 125 are visualised as attached to the antenna attachment side 10.

A snap link 125 is a metal loop with a spring-loaded gate and it is also referred to as a snap hook, carabiner or a German Karabinerhaken. In one alternative, holes in the antenna attachment part 18 constitute the snap link attachment device 126 where the snap links are to be hooked into.

The described attachment solutions provide for alternative simple and less time consuming attaching of the antenna 11 to the antenna attachment part 18 and thereby the antenna mounting device 14. In all described variants of the antenna mounting device 13 the different attachment solutions are interchangeable unless otherwise is stated.

FIGS. 6-11 illustrate different views of aspects of the antenna mounting device 13 where at least one of the first adjustment element and the second adjustment element comprises a gear screw 40a 50a being in engagement with a gear wheel 48, 58 such that a rotation of the gear screw 40a, 50a pivots the gear wheel 48, 58 about a gear wheel axis 45, 55. Furthermore, the pivoting about the gear wheel axis 45, 55 pivots the antenna attachment part 18 about at least one of a first pivot axis 38 and a second pivot axis 39 to provide adjustment in one of the first direction A and the second direction B of the directional antenna 11.

By utilizing gears the accuracy of the adjustment increases and the torque applied to the ends 41, 51 of the adjustment elements 40, 50 can be scaled in magnitude by the gear wheel 48, 58. Furthermore, the introduction of gears opens up for an increased freedom to position the adjustment elements 40, 50 in various ways in relation to the infrastructure part 16. That is, depending on choice of gear, the axis 43, 53 of the screw 40a, 50a and the pivot axis 38, 39 of the antenna adjustment part 18 can be arranged in any preferred angle. For further details regarding gears see the text in connection to FIG. 2.

Moreover, at least one of the first gear wheel 48 and the second gear wheel 58 is operatively connected to a universal joint 49 and the universal joint 49 is further operatively connected to the antenna attachment part 18.

The universal joint 49 reduces the need for the gear wheel axis 45, 55 and the associated pivot axis 38, 39 of the antenna attachment part 18 to be aligned in order to provide adjustment in one direction of the directional antenna 11 attached to the antenna attachment part 18. This is due to the fact that a universal joint 49 is a joint or a coupling in a rigid rod that allows the rod to bend in any direction. It is commonly used in shafts that transmit rotary motion. The universal joint 49 consists of a pair of hinges 49a, 49b located close together, oriented at 90° to each other and connected by a cross shaft. The universal joint 49 is also referred to as universal coupling, U-joint, Cardan joint, Hardy-Spicer joint, or Hooke's joint.

When talking about a universal joint 49 in this text any kind of device with the same function as a universal joint is to be considered as an interchangeable alternative. Considerable options are for example swivels, ball joints, ball and socket joints, or strong springs.

Figure 6:
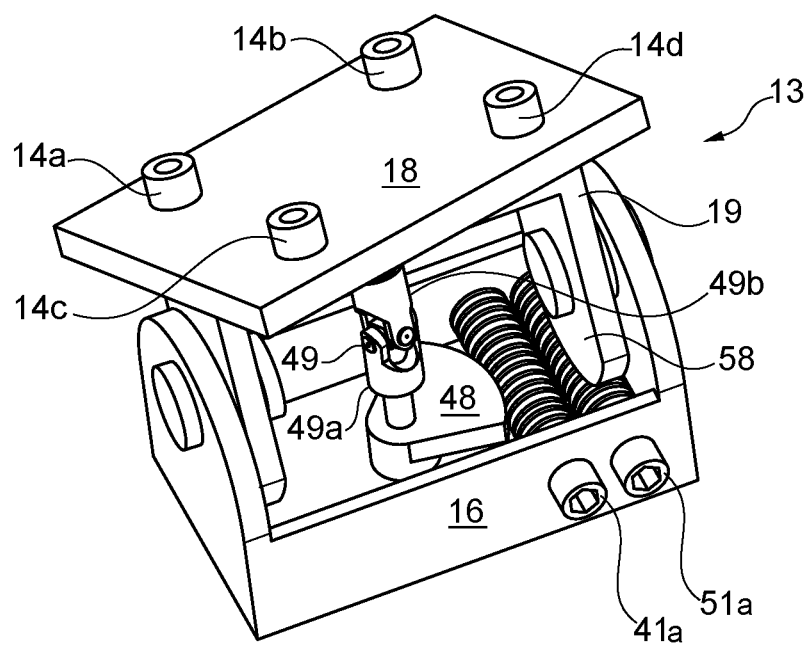
FIG. 6 is a schematic 3D-drawing of further aspects of the antenna mounting device.
Figure 7:
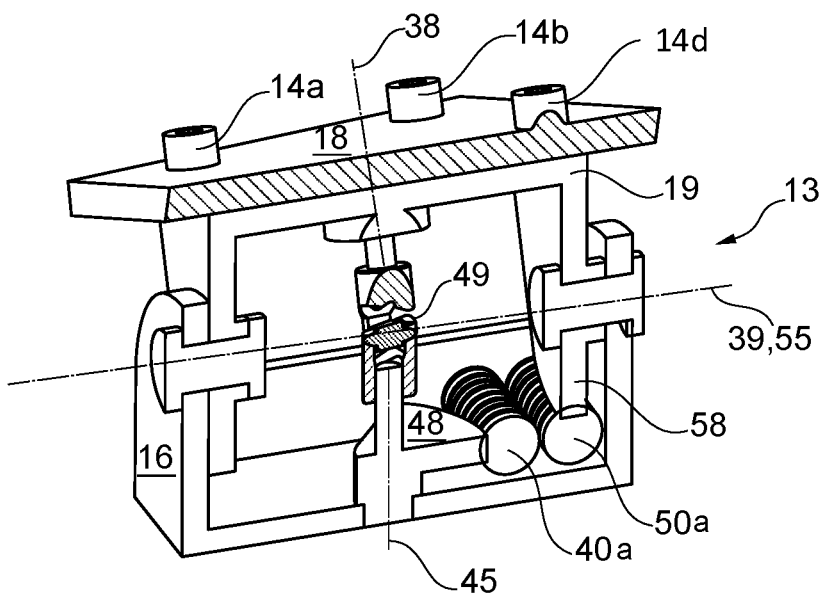
FIG. 7 is a cross section of aspects of the antenna mounting device in FIG. 6.

FIG. 6 shows a schematic 3D drawing of aspects of the antenna mounting device 13 and FIG. 7 is a 3D cross section of the same. Present is the infrastructure part 16, a movable member 19, a universal joint 49, and the antenna attachment part 18 with attachment devices 14a-14d. The first adjustment element 40 and the second adjustment element 50 comprise gear screws and associated gear wheels 48, 58. The gear screw 40a, 50a and the gear wheel 48, 58 in each pair form a self-locking worm gear 98.

The utilization universal joint 49 is suitable in this solution since it allows for an adjustment of a first direction A, irrespectively of position of the antenna attachment part 18 and thereby the movable member 19 in the second direction B. That is, the first gear wheel axis 45 does not have to be aligned with the first pivot axis 38.

In FIG. 7 the attachment devices 14a-14d are e.g. screw holes or bolt holes, such that the antenna 11 is attached to the antenna attachment part 18 by e.g. screws or bolts. Of course other attachment alternatives can be utilized as well, see further discussion in connection to FIGS. 18 and 19.

Applying a torque to the first end 41 of the first adjustment screw 40a causes the first adjustment screw 40a to rotate along its centre axis. The first adjustment screw 40a is in engagement with the first gear wheel 48, and hence the rotational movement of the first adjustment screw 40a rotates the first gear wheel 48 about a first gear wheel axis 45. The first gear wheel 48 is further operatively connected to a universal joint 49 along the first gear wheel axis 45. That is, the rotation of the first gear wheel 48 about the first gear wheel axis 45 pivots a first hinge 49a of the universal joint 49 about the same axis. The universal joint 49 is further operatively connected to the antenna attachment part 18 along a first pivot axis 38. Hence, the rotational movement of the first hinge 49a about the first gear axis 45 is transformed into a pivoting of the second hinge 49b about the first pivot axis 38. Thereby, also the antenna attachment part 18 is pivoting about the first pivot axis 38 resulting in an adjustment of the antenna attachment part 18 and the antenna 11 in a first direction.

Applying a torque to the first end 51 of the second adjustment screw 50 causes the second adjustment screw 50 to rotate along its centre axis. The second adjustment screw 50 is in engagement with the second gear wheel 58, and hence the rotational movement of the second adjustment screw 50 rotates the second gear wheel 58 about a second gear wheel axis 55. The second gear wheel 58 is further rotationally connected to a movable member 19 along the second gear wheel axis 55. Hence, the rotational movement about the second gear wheel axis 55 pivots the movable member 19 about the same axis and also about a second pivot axis 39. In this solution, the second gear wheel axis 55 and the second pivot axis 39 coincide. The movable member 19 is further attached to the antenna attachment part 18. Thereby, also the antenna attachment part 18 is pivoting about the second pivot axis 39 resulting in an adjustment of the antenna attachment part 18 and the antenna 11 in a second direction.

Using self-locking worm gears means that there is no need for lock nuts that have to be tightened by the installer. That is, the installation is simplified. When lock nuts are present there is a risk for an unintentional movement of the adjustment elements during the tightening of the nuts. Hence, by omitting the lock nuts the alignment can be made in a more accurate manner.

Moreover, as previously discussed the accuracy of the adjustment is increased when utilizing worm gears. A directional antenna with a very narrow main lobe might require an accuracy of the adjustment of at least 0.1 degree. This could for example be achieved by a gear with a single start worm combined with a 100 tooth gear wheel, which is a gear with an angular speed gear ratio of 100:1. This means that a 10 degrees turn of the adjustment screw is transformed into 0.1 degree adjustment of the antenna in a specific direction.

Other gear solutions are of course also possible. For example, the gear screw 40a, 50 and the gear wheel 48, 58 can form a bevel gear 99.

Further alternative gears that are possible to utilize are e.g. worm face gear 97, cage gear, and rack and pinion gear, see the discussion in reference to FIG. 2.

Generally speaking, the type of gear is not restricted to the ones mentioned in this text. Any kind of gear that is applicable in order to carry out the matter can be utilized. The choice is rather focused towards the facts that the gear needs to have a specific physical design that provides for a transmission of the input rotation to the pivot axis of the members that adjust the antenna adjustment part 18 of the antenna mounting device 13. That is the choice depends e.g. on how the adjustment elements 40, 50 are positioned in relation to the antenna adjustment part 18. Moreover, as previously mentioned, the gear ratio related to the accuracy of the adjustment is important when choosing a gear in order to achieve the desired accuracy.

To further clarify, different types of gears can be utilized for the adjustment of the first direction A, e.g. the elevation direction, of the antenna and the second direction B, e.g. the azimuth direction, of the antenna, respectively.

Figure 8:
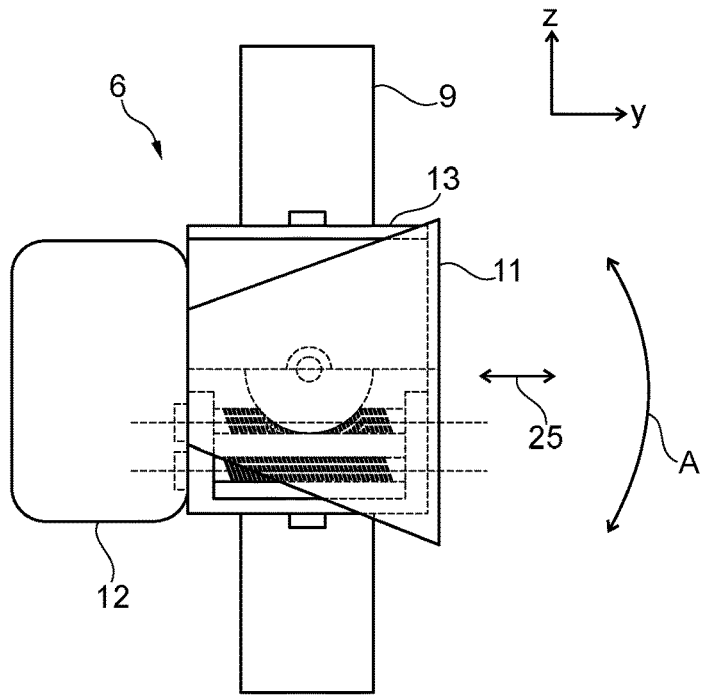
FIG. 8 shows an illustration of how an antenna, a radio, and aspects of the antenna mounting device in FIG. 6 can be arranged in relation to infrastructure in an yz-plane.

FIG. 8 shows an illustration in the yz-plane of a mounting arrangement 6 comprising aspects of the antenna mounting device 13. The mounting arrangement 6 comprises an infrastructure 9 and at least one antenna mounting device 13 where the antenna mounting device 13 is connected to the infrastructure 9 and at least one directional antenna 11 with communication direction 25. The antenna 11 is further connected with at least one radio 12.

The mounting arrangement 6 is combinable with all variants of the antenna mounting device 13 as well and a further description of the devices and their features are given in reference to the text in connection to FIG. 1. To clarify, the positioning of the antenna 11 and the radio 12 in relation to the antenna attachment part 18 and the infrastructure 9 in the different illustrative figures should in no way be considered as a limitation of the scope of protection. It is merely examples.

Thus there is provided herein a mounting arrangement 6 facilitating the alignment of a directional antenna 11 in order to provide for communication 25 with another antenna. Thereby, the same advantages and benefits are obtained for the mounting arrangement 6 as for the antenna mounting device 13 as such.

Figure 9:
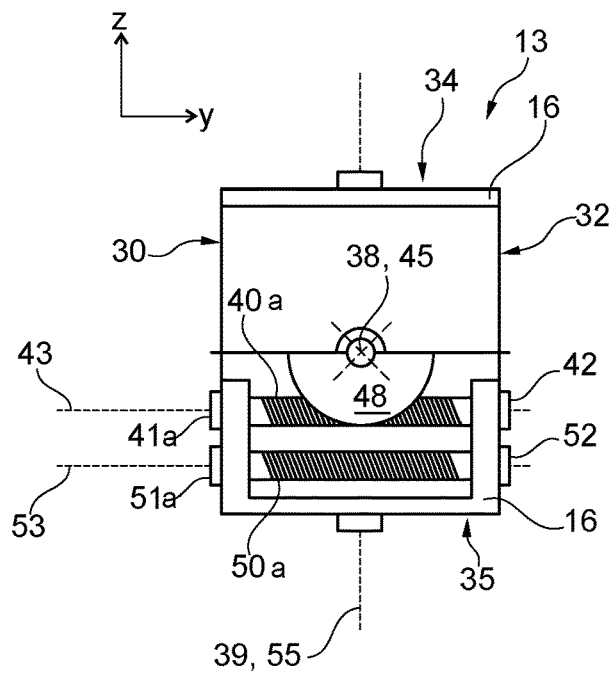
FIG. 9 shows a cross section in the yz-plane of aspects of the antenna mounting device in FIG. 6.

FIG. 9 shows a cross section in the yz-plane of aspects of the antenna mounting device.

The first heads 41a, 51a of the gear screws 40a, 50a are arranged in a raised position on the same side, i.e., on the left side 30, of the infrastructure part 16.

The gear screws 40a, 50a are penetrating through the left side 30 and the right side 32 of the infrastructure part 16.

Moreover, the first gear screw 40a comprises a second end 42 and the second gear screw 50a further comprises a second end 52. The second ends are arranged in a raised position on the right side 32 of the infrastructure part 16. Furthermore, the second end 42 of the first gear screw 40a and the second end 52 of the second gear screw 50a are positioned at a fixed position relative to each other independently of the relative orientation of the infrastructure and the antenna attachment part.

That is, both the first head 41a and the second head 42 of the first gear screw 40a are stationary in relation to the centre axis 43 of the first gear screw 40a during the alteration of the antenna attachment part 18 and thereby the antenna 11 in the first direction, e.g. the elevation direction A. In the same manner is both the first head 51 and the second head 52 of the second gear screw 50 stationary in relation to the centre axis 53 of the second gear screw 50 during the alteration of the antenna attachment part 18 and thereby the antenna 11 in the second direction, e.g. the azimuth direction B. In other words, the heads do not move along the centre axis of their corresponding gear screw during the adjustment of the antenna.

Differently expressed, the second head 42 of the first gear screw 40a and the second head 52 of the second gear screw 50 are positioned at a fixed position relative to each other independently of the relative orientation of the infrastructure and the antenna attachment part 18.

Moreover, the mutual distance between the first head 41a of the first gear screw 40a and the first head 51a of the second gear screw 50a is substantially equal to the mutual distance between the second head 42 of the first gear screw 40a and the second head 52 of the second gear screw 50a.

This could mean that even the second end 42 of the first gear screw 40a and the second end 52 of the second gear screw 50a are the same type of structural members.

Observe that the second ends 42, 52 are optional and not necessary features.

Such arrangement allows for an easier access to the gear screws 40a, 50a. For example, if the second ends 42, 52 comprise surfaces for engagement with a tool in the same manner as the heads 41a, 51 doa, then the installer can choose which ends he wants to utilize in the alignment of the antenna 11. That is, he can use either the first heads 41a, 51a or the second ends 42, 52 depending on which ones he has the easiest access to.

Figure 10:
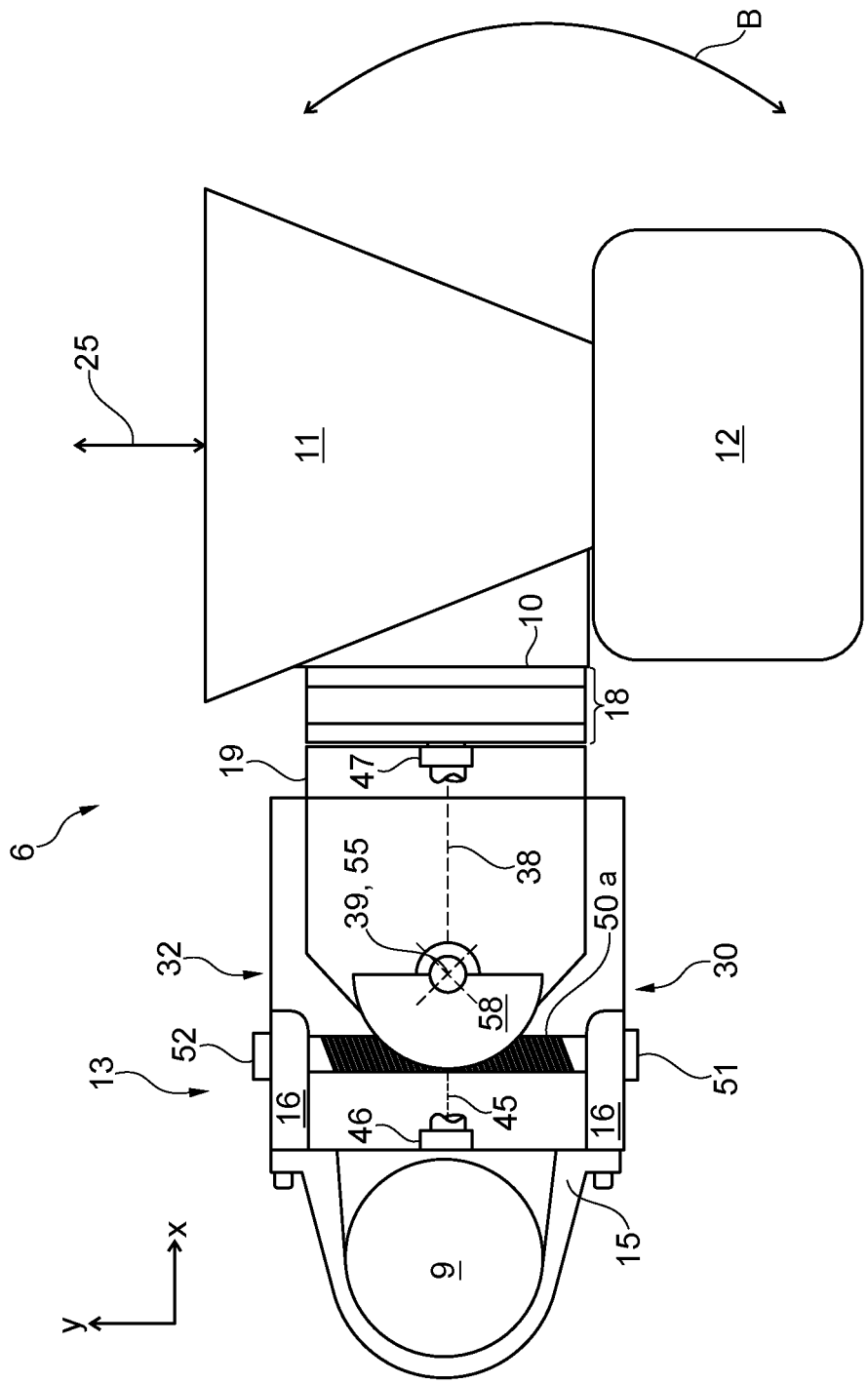
FIG. 10 shows a cross section in a xy-plane of a mounting arrangement comprising aspects of the antenna mounting device in FIG. 6.

FIG. 10 shows figuratively the same mounting arrangement 6 as is shown in FIG. 8 but now viewed in the xy-plane. In this view also a clamp 15 utilized to attach the antenna mounting device 13 to the infrastructure 9 is shown. Moreover, a change of the antenna aperture in the azimuth direction B corresponds to a movement along a directional vector in said plane.

Observe that the first adjustment element and most of its coupling to the antenna attachment part 18 in order to make an alteration of the antenna in the elevation direction A are omitted in this figure. Only the part of a lever 46 aligned with the first gear wheel axis 45 and part of a lever 47 aligned with the first pivot axis 38 is shown. The reason is to point out that the mechanical solution to achieve said adjustment can differ.

Figure 11:
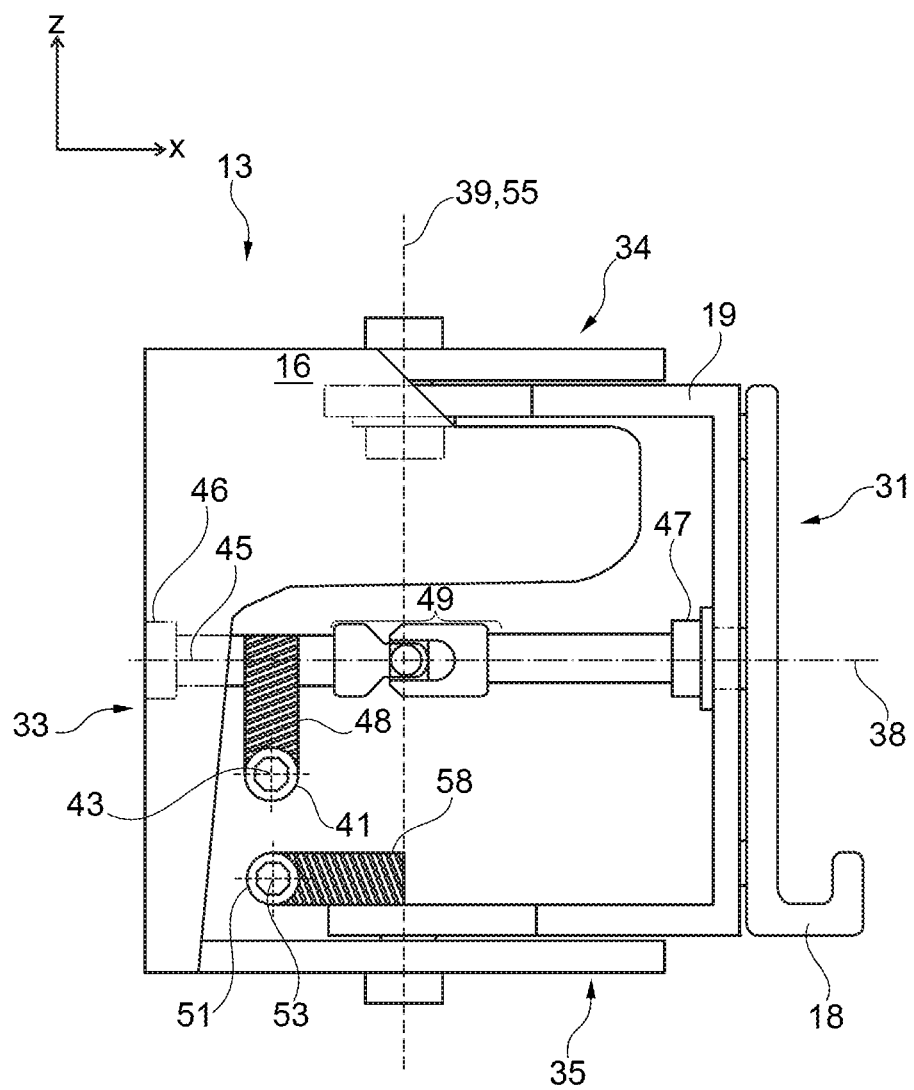
FIG. 11 shows a cross section in the xz-plane of aspects of the antenna mounting device in FIG. 6.

FIG. 11 shows another figurative cross section in the xz-plane of aspects of the antenna mounting device.

In this view, it is seen that each end 41, 51 further comprises a centre which is located on a centre axis 43, 53.

Furthermore, the centre of the first end 41 of the first gear screw 40a is configured to remain at a fixed position relative to the first end 51 of the second gear screw 50a and relative to the infrastructure part 16, independently of the relative orientation of the infrastructure and the antenna attachment part 18.

In other words, the centre axes 43, 53 of the gear screws 40a, 50a are fixed in relation to each other and to the antenna attachment part 18 during the change of position of the antenna attachment part 18.

Alternatively expressed, the positions of the centres of the ends 41, 51 are in fixed relative positions to each other when the first direction and/or the second direction are changed. That is, the gear screws 40a, 50a are not moved away or closer to each other during alteration of the antenna attachment part 18. All other exemplary variants of the antenna mounting device 13 have the same features.

The infrastructure part 16 is only partially shown in order to see the inside mechanical structure of the antenna mounting device 13.

Figure 12:
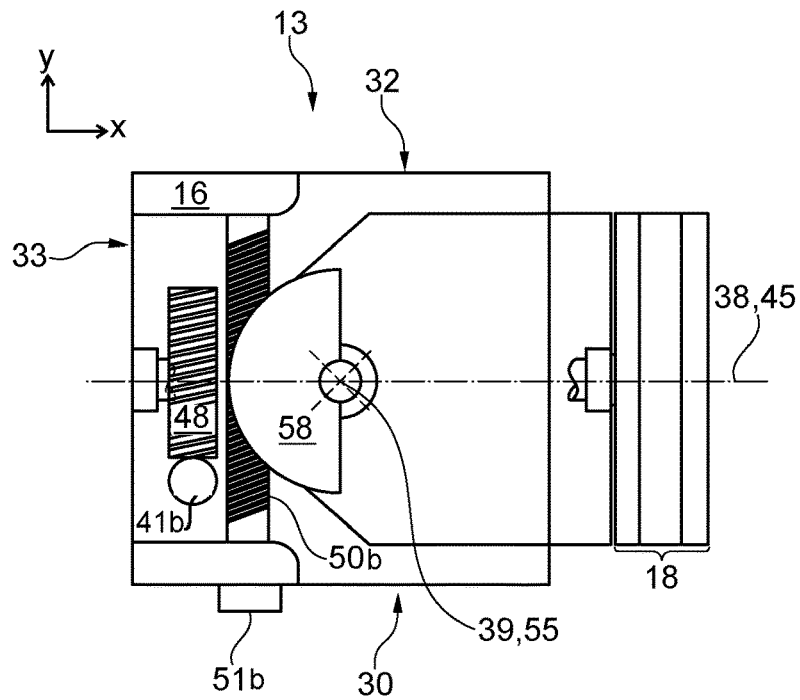
FIG. 12 illustrates a cross section in the xy-plane of other aspects of the antenna mounting device.

FIG. 12 illustrates a cross section in the xy-plane of further aspects of the antenna mounting device.

The aspects of the antenna mounting device 13 in FIG. 12 differs from the once in FIGS. 6-11 in that the first heads 41b, 51b of the gear screws (e.g., gear screw 50b) are arranged on different sides. That is, the first head 41b of the first adjustment element 40 is now arranged on the second side 34, of the infrastructure part 16. See further discussion of such arrangement in reference with the text to FIG. 5.

Moreover, the first adjustment element 40 is penetrating through the second side 34 and the underside 35 of the infrastructure part 16.

In this illustration of the antenna mounting device 13 the optional second ends of the adjustment devices are omitted.

Observe that the first adjustment element 40 and most of its coupling to the antenna attachment part 18 in order to make an alteration of the antenna in the elevation direction are omitted in this figure for clarification purpose.

Figure 13:
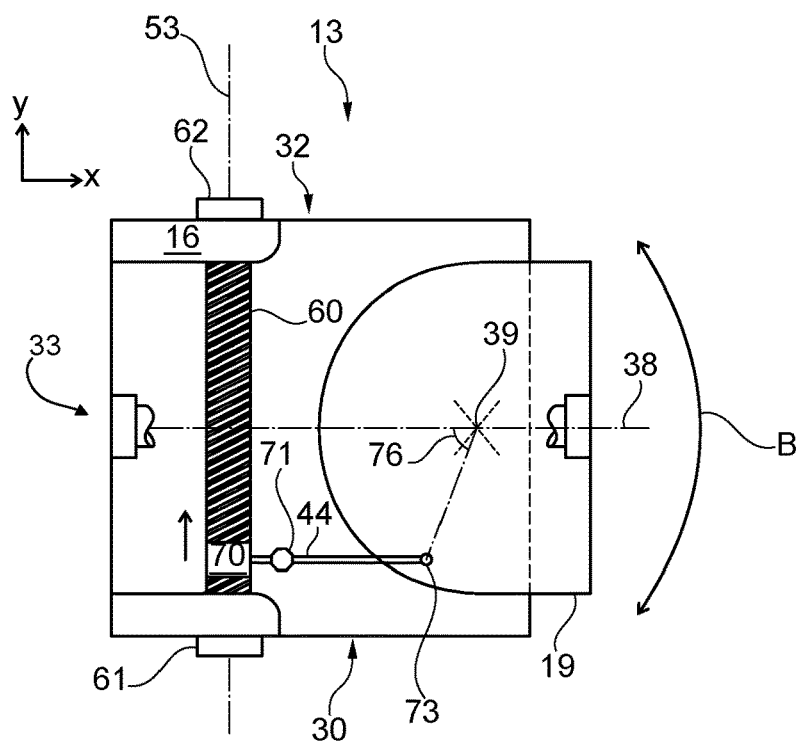
FIG. 13 illustrates a cross section in the xy-plane of even further aspects of the antenna mounting device.

In FIG. 13 a schematic cross section in the xy-plane of other aspects of the antenna mounting device 13 is illustrated. That is, present is an antenna mounting device 13 wherein at least one of the first adjustment element and the second adjustment element 60 comprises a screw with a centre axis 53. The screw is further in engagement with a nut 70 such that a pivoting of the screw about its centre axis 53 moves the nut 70 axially along the centre axis of the screw. The nut 70 is further being coupled via at least one flexible joint 71 to an attachment point 73 on a movable member 19. The movable member 19 is operatively coupled to the antenna attachment part such that a movement of the attachment point 73 pivots the antenna attachment part about one of a first pivot axis 38 and a second pivot axis.

In FIG. 13, the antenna attachment part 18 is adjustable in the azimuth direction B. Hence, the second adjustment element 60 comprises a screw 60, denoted as the second screw 60.

Furthermore, the second screw 60 comprises a first head 61 and a second head 62, the second head being optional.

The second screw 60 is penetrating through the left side 30 and the right side 32 of the infrastructure part 16. The first head 61 is arranged in a raised position relative to the outer surface of the left side 30 and the second head 62 is arranged in a raised position relative to the outer surface of the right side 32.

Both the first head 61 and the second head 62 of the second screw 60 are stationary in relation to the centre axis 53 of second screw 60 during the alteration of the antenna attachment part and thereby the antenna in the azimuth direction B. In other words, the heads 61, 62 do not move along the centre axis 53 of the second screw 60 during the adjustment of the antenna 11.

Applying a torque to the first end 61 of the second screw 60, cause the second screw 60 to rotate along its centre axis 53. The second screw 60 is in engagement with a nut 70 such that when the second screw is rotated the nut moves along the centre axis 53. The nut 70 is further coupled to a joint lever 44 comprising a flexible joint 71. The joint lever 44 is further attached to the movable member 19 at an attachment point 73. The attachment point 73 is displaced with regard to the second pivot axis 39 such that a movement of the attachment point 73 causes the movable member 19 to pivot about the second pivot axis 39. Hence, adjustment in the second direction, i.e., the azimuth direction B, of the directional antenna 11 attached to the antenna attachment part 18 is achieved.

The joint lever 44 can be positioned substantially perpendicular to the centre axis 53 of the second screw 60.

The antenna attachment part needs to be pre-tilted in the azimuth direction B when utilizing the described mechanical solution. If for example the maximum angle of rotation 76 is 90 degrees, then the antenna attachment part 18 needs to be pre-tilted −45 degrees in order to allow for an adjustment between −45 degrees to +45 degrees of the antenna attachment part 18.

The closer the attachment point 73 is to the second pivot axis 39, the less accurate is the adjustment. That is, if the attachment point 73 is close to the second pivot axis 39, a small rotation of the adjustment element 61 transforms into a large angular movement of the movable member 19.

The flexible joint 71 can in this context be any kind of device that permits bending in at least one plane. It can for example be a strong spring, an articulated joint, hinge, or a universal joint as mentioned before.

The nut 70 can be any kind of device that comprises a threaded portion that in engagement with the screw is moved along the centre axis of the screw. This applies to the other exemplary variants of nuts as well.

The illustration in FIG. 13 provides for a simple mechanical solution where the input torque applied to the end 61, 62 of the second adjustment element 60 is transformed into an alteration of the antenna attachment part 18 and thereby the directional antenna 11 in the azimuth direction B.

Observe that the first adjustment element and most of its coupling to the antenna attachment part in order to make an alteration of the antenna in the elevation direction are omitted in this figure.

Figure 14:
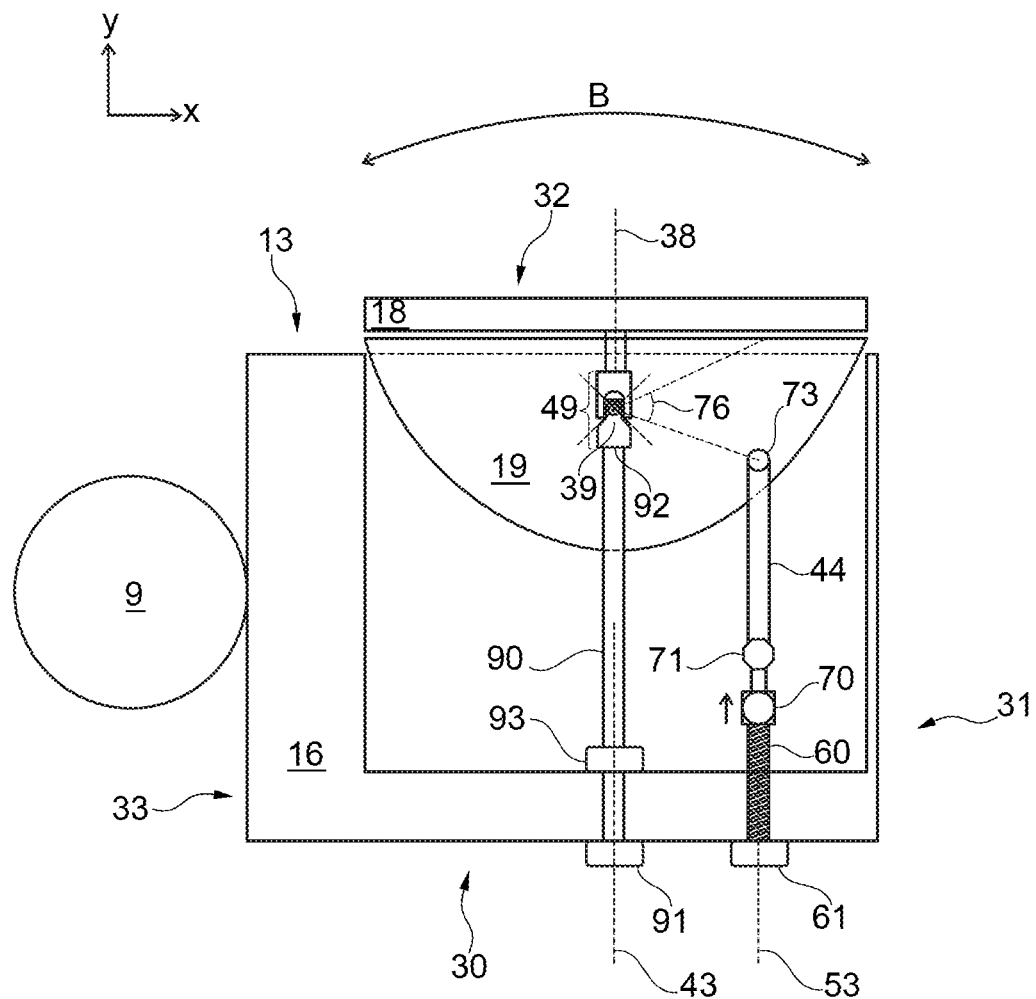
FIG. 14 illustrates a cross section in the xy-plane of some aspects of the antenna mounting device.

FIG. 14 illustrates a cross section in the xy-plane of aspects of the antenna mounting device 13 and its attachment to infrastructure 9. Present is the antenna mounting device 13 wherein at least one of the first adjustment element 90 and the second adjustment element comprises a screw 90 with a center axis 43. The screw 90 is further in engagement with a locking arrangement 93, and a universal joint 49, and coupled to the antenna attachment part 18 such that a pivoting of the screw 90 about its centre axis 43 pivots the antenna attachment part 18 about one of a first pivot axis 38 and a second pivot axis 39.

That is, the first adjustment element 90 comprises a screw 90, denoted as the first screw 90, which is configured to adjust the antenna attachment part 18 in a first direction, e.g. an elevation direction.

The adjustment in the elevation direction is achieved by applying a torque to the first end 91 of the first screw 90. This causes the first screw 90 to rotate along its centre axis 43. The second end 92 of the first screw 90 is coupled to the antenna attachment part 18 via a universal joint 49. Hence, a rotation of the first screw 90 is transformed into a rotation of the antenna attachment part 18 about the first pivot axis 38.

The illustration in FIG. 14 provides for an alternative simple mechanical solution where the input torque applied to the end 91 of the first adjustment element 90 is transformed into an alteration of the antenna attachment part 18 and thereby the directional antenna 11 in the elevation direction irrespectively of the position of the antenna attachment part 18 in the azimuth direction B.

In order to fixate the antenna attachment part 18 into a desired position in the elevation direction a lock nut 93 or a lock device with similar properties is appreciated. The positioning of the lock device is optional and it might also be present in the variants of the antenna mounting device 13 described in the other figures.

The adjustment in the azimuth direction B is similar to that described in relation to FIG. 13. The difference is that the joint lever 44 can be positioned substantially parallel to the centre axis 53 of the second screw 60. Moreover, the second adjustment element 60 continues behind the joint lever 44 in the figure.

Figure 15:
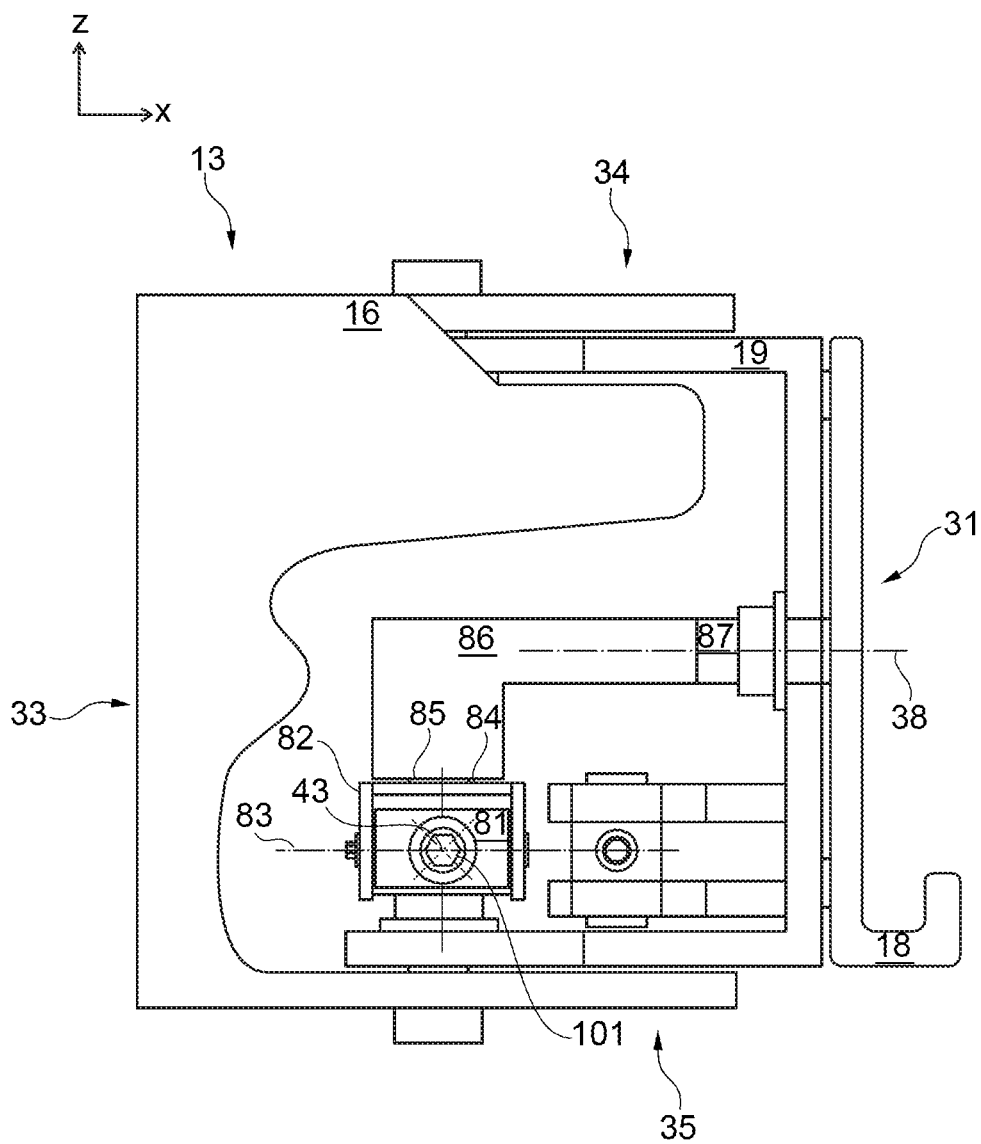
FIG. 15 illustrates a cross section in the xz-plane of some other aspects of the antenna mounting device.

FIG. 15 illustrates a cross section in the xz-plane of further aspects of the antenna mounting device 13.

According to aspects shown in FIG. 15 it is provided for an alternative simple mechanical solution where the input torque applied to the first end 101 of the first adjustment element is transformed into an alteration of the antenna attachment part 18 and thereby the directional antenna 11 in the elevation direction.

The first adjustment element comprises a screw, with a first end 101 and a centre axis 43. The screw is in engagement with a nut 81 such that a pivoting of the screw about its centre axis 43 moves the nut 81 along the centre axis 43 of the screw. The nut 81 is further movable connected to a tilting arrangement 82 via a pivot axis 83 of the tilting arrangement 82. Moreover, a top surface 84 of the tilting arrangement 82 is connected to a hinge (not visible in the drawing). The connection could for example be via an arrangement with adjustable length, e.g., a lever running in a track or a spring. The connection to the hinge is provided such that the distance between the tilting arrangement 82 and a first pivot axis 38 changes as the nut 81 moves along the centre axis 43 of the screw. The hinge is further connected therewith to an angled lever 86 comprising a part extending along the first pivot axis 38 ending in a second end 87. Hence, a movement of a first end 85 of the angled lever 86 along the centre axis 43 of the screw rotates the part of the angled lever 86 that extends along the first pivot axis 38 about the first pivot axis 38. Furthermore, the second end 87 of the angler lever 86 is rotationally coupled to the antenna attachment part 18 to provide adjustment of the antenna attachment part 18 and the antenna in a first direction, i.e., in the elevation direction.

The infrastructure part 16 is only partially shown in order to see the inside mechanical structure of the antenna mounting device 13.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled person in the art to utilize the example embodiments in various manners and with various modifications as are suited to the particular use contemplated. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims.

The invention claimed is:

1. An antenna mounting device for mounting a directional antenna to fixed infrastructure adjustable in a first direction, the antenna mounting device comprising:
    a first adjustment element comprising a first end;
    an infrastructure part for attaching the antenna mounting device to the fixed infrastructure; and
    an antenna attachment part for attaching the directional antenna to the antenna mounting device;
    wherein the first adjustment element is coupled to the infrastructure part and to the antenna attachment part, and configured to adjust a first orientation of the antenna attachment part relative to an orientation of the infrastructure part, to provide adjustment in the first direction of the directional antenna;
    wherein the first end of the first adjustment element is configured to remain at a fixed position relative to the infrastructure part, independently of the relative orientation of the infrastructure and the antenna attachment part
    a second adjustment element comprising a first end;
    wherein the second adjustment element is coupled to the infrastructure part and to the antenna attachment part, and configured to adjust a second orientation of the antenna attachment part relative to the orientation of the infrastructure part, to provide adjustment in the second direction of the directional antenna;
    wherein the first end of the second adjustment element is configured to remain at a fixed position relative to the infrastructure part and relative to the first end of the first adjustment element, independently of the relative orientation of the infrastructure and the antenna attachment part.

2. The antenna mounting device according to claim 1, wherein the first end of the first adjustment element and the first end of the second adjustment element are positioned at a constant mutual distance during adjustment of the antenna attachment part.

3. The antenna mounting device according to claim 1,
    wherein the first adjustment element comprises a second end;
    wherein the second adjustment element comprises a second end;
    and wherein the second end of the first adjustment element and the second end of the second adjustment element are positioned at a fixed position relative to each other independently of the relative orientation of the infrastructure and the antenna attachment part.

4. The antenna mounting device according to claim 1, wherein the infrastructure part comprises:
    a first side;
    wherein the first end of the first adjustment element and the first end of the second adjustment element are arranged in connection to the first side.

5. The antenna mounting device according to claim 1,
    wherein the infrastructure part comprises:
    a first side and a second side;
    wherein the first end of the first adjustment element is arranged in connection to the first side and the first end of the second adjustment element is arranged in connection to the second side.

6. The antenna mounting device according to claim 1,
    wherein at least one of the first adjustment element and the second adjustment element comprises a gear screw being in engagement with a gear wheel such that a rotation of the gear screw pivots the gear wheel about a gear wheel axis; and
    wherein the pivoting about the gear wheel axis pivots the antenna attachment part about at least one of a first pivot axis and a second pivot axis to provide adjustment in one of the first direction and the second direction of the directional antenna.

7. The antenna mounting device according to claim 6,
    wherein at least one of the first gear wheel and the second gear wheel is operatively connected to a universal joint; and
    wherein the universal joint is further operatively connected to the antenna attachment part.

8. The antenna mounting device according to claim 6, wherein the gear screw and the gear wheel form a self-locking worm gear.

9. The antenna mounting device according to claim 6, wherein the gear screw and the gear wheel form a bevel gear.

10. The antenna mounting device according to claim 1,
    wherein at least one of the first adjustment element and the second adjustment element comprises a screw with a centre axis;
    wherein the screw is in engagement with a locking arrangement, and a universal joint, and coupled to the antenna attachment part such that a pivoting of the screw about its centre axis pivots the antenna attachment part about one of a first pivot axis and a second pivot axis.

11. The antenna mounting device according to claim 1,
wherein at least one of the first adjustment element and the second adjustment element comprises a screw with a centre axis;
wherein the screw is in engagement with a nut such that a pivoting of the screw about its centre axis moves the nut axially along the centre axis of the screw;
the nut further being coupled via at least one flexible joint to an attachment point on a movable member, said movable member being operatively coupled to the antenna attachment part such that a movement of the attachment point pivots the antenna attachment part about one of a first pivot axis and a second pivot axis.

12. The antenna mounting device according to claim 11, wherein the first direction corresponds to an altitude direction of the directional antenna when mounted to the fixed infrastructure.

13. The antenna mounting device according to claim 11, wherein the second direction corresponds to an azimuth direction of the directional antenna when mounted to the fixed infrastructure.

14. The antenna mounting device according to claim 1, wherein a compass or at least one level control equipment is attached to the antenna mounting device.

15. The antenna mounting device according to claim 1, wherein the first adjustment element and the second adjustment element are the same type of adjustment mechanism.

16. The antenna mounting device according to claim 1, wherein the directional antenna comprises a click on device and wherein the antenna attachment part comprises a matching click on device.

17. The antenna mounting device according to claim 1, wherein the directional antenna comprises at least one of a snap link and a snap link attachment device and wherein the antenna attachment part comprises a snap link attachment device and a snap link.

18. A mounting arrangement comprising an infrastructure and at least one antenna mounting device according to claim 1;
the antenna mounting device being connected to the infrastructure and at least one directional antenna with at least one radio.

* * * * *